(12) United States Patent
Hahn et al.

(10) Patent No.: US 12,353,278 B2
(45) Date of Patent: Jul. 8, 2025

(54) PRE-EMPTIVE OPERATIONS FOR FASTER XOR RECOVERY AND RELOCATION

(71) Applicant: Western Digital Technologies, Inc., San Jose, CA (US)

(72) Inventors: Judah Gamliel Hahn, Ofra (IL); Michael Ionin, Rehovot (IL); Alexander Bazarsky, Holon (IL); Karin Inbar, Ramat Hasharon (IL)

(73) Assignee: Sandisk Technologies, Inc., Milpitas, CA (US)

( * ) Notice: Subject to any disclaimer, the term of this patent is extended or adjusted under 35 U.S.C. 154(b) by 99 days.

(21) Appl. No.: 18/219,819

(22) Filed: Jul. 10, 2023

(65) Prior Publication Data
US 2025/0021429 A1    Jan. 16, 2025

(51) Int. Cl.
*G06F 11/00* (2006.01)
*G06F 3/06* (2006.01)
*G06F 11/07* (2006.01)
*G06F 11/10* (2006.01)

(52) U.S. Cl.
CPC ........ *G06F 11/1004* (2013.01); *G06F 3/0619* (2013.01); *G06F 3/064* (2013.01); *G06F 3/0673* (2013.01); *G06F 11/0754* (2013.01)

(58) Field of Classification Search
CPC ............... G06F 11/0754; G06F 11/076; G06F 11/0727; G06F 11/1004; G06F 3/0619; G06F 3/064; G06F 3/0673
See application file for complete search history.

(56) References Cited

U.S. PATENT DOCUMENTS

| | | |
|---|---|---|
| 10,303,571 B2 | 5/2019 | Wu et al. |
| 10,963,339 B2 | 3/2021 | Ji et al. |
| 11,048,584 B2 | 6/2021 | Jeon |
| 11,121,729 B1 | 9/2021 | Sridhara et al. |
| 11,354,190 B2 | 6/2022 | Sehgal et al. |

(Continued)

FOREIGN PATENT DOCUMENTS

WO    2017-103751 A1    6/2017

OTHER PUBLICATIONS

International Search Report and Written Opinion for Application No. PCT/US2024/029536 dated Sep. 4, 2024.

*Primary Examiner* — Joseph D Manoskey
(74) *Attorney, Agent, or Firm* — Patterson + Sheridan, LLP

(57) ABSTRACT

During data storage device operation, data of multiple blocks of a non-volatile memory device, logically grouped as a jumboblock, may be protected by an exclusive or (XOR) signature, where the XOR signature may be used to recover data of a block of the multiple blocks. During a recovery/relocation operation, data of the jumboblock is read from the non-volatile memory device during the recovery of the lost data and again when the data is relocated. However, because the data read during data storage device operation is temporarily stored in a volatile memory device, the controller utilizes the relevant data stored in the volatile memory device and the data stored in the non-volatile memory device to recover corrupted data. Thus, the amount of reads from the non-volatile memory device decreases due to the relevant data is read from the volatile memory device, which may improve data storage device performance.

20 Claims, 6 Drawing Sheets

(56) References Cited

U.S. PATENT DOCUMENTS

| | | | |
|---|---|---|---|
| 2014/0281814 A1* | 9/2014 | Vogan | G06F 3/0679 |
| | | | 714/766 |
| 2015/0161004 A1* | 6/2015 | Camp | G06F 3/0689 |
| | | | 714/6.24 |
| 2017/0091022 A1 | 3/2017 | Khan et al. | |
| 2017/0228299 A1 | 8/2017 | Shapira et al. | |
| 2018/0074891 A1 | 3/2018 | Yang et al. | |
| 2020/0174681 A1* | 6/2020 | Malshe | G06F 3/0625 |
| 2020/0218605 A1* | 7/2020 | Subramanian | G06F 11/108 |
| 2022/0138065 A1* | 5/2022 | Secatch | G06F 3/0679 |
| | | | 714/6.12 |

* cited by examiner

PRE-EMPTIVE OPERATIONS FOR FASTER XOR RECOVERY AND RELOCATION

BACKGROUND OF THE DISCLOSURE

Field of the Disclosure

Embodiments of the present disclosure generally relate to data storage devices, such as solid state drives (SSDs), and, more specifically, improving relocation and recovery operations in a data storage device.

Description of the Related Art

When data is received from a host device, a controller of a data storage device may generate protection data for the data prior to storing the data in a non-volatile memory (NVM) of the data storage device. The protection data may be utilized to recover associated data due to errors accumulating or data corruption in order to guarantee data returned to the host device is free from integrity issues. The protection data is stored along with the data in the NVM. When the data is read from the NVM, the relevant protection data is also read from the NVM. Prior to providing the data back to a host device or relocating the data in the NVM, the data is checked for any errors. If errors are present, the relevant protection data is utilized to recover the data. When the data is recovered, the data may also be relocated to a new location in the NVM.

An example of protection data is exclusive or (XOR) data signature. For a jumboblock, which is a logical grouping of one or more blocks across a plurality of dies of the NVM, XOR signature is generated XORing data from a same page of each block. When recovering data of a block of the jumboblock, the data of the block may be recovered by XORing all adjacent pages of each block that belong to the same XOR signature. Thus, each page of the jumboblock is read a first time during the recovery operation and a second time during the relocation operation that may follow the recovery operation. Thus, the recovery/relocation may be time consuming and require multiple reads from the NVM, which may further degrade the blocks of the jumboblock of the NVM.

Therefore, there is a need in the art for an improved relocation/recovery operation in a data storage device to ensure data integrity.

SUMMARY OF THE DISCLOSURE

The present disclosure generally relates to data storage devices, such as solid state drives (SSDs), and, more specifically, improving relocation and recovery operations in a data storage device. During data storage device operation, data of multiple blocks of a non-volatile memory device, logically grouped as a jumboblock, may be protected by an exclusive or (XOR) signature, where the XOR signature may be used to recover data of a block of the multiple blocks. During a recovery/relocation operation, data of the jumboblock is read from the non-volatile memory device during the recovery of the lost data and again when the data is relocated. However, because the data read during data storage device operation is temporarily stored in a volatile memory device, the controller utilizes the relevant data stored in the volatile memory device and the data stored in the non-volatile memory device to recover corrupted data. Thus, the amount of reads from the non-volatile memory device decreases due to the relevant data is read from the volatile memory device, which may improve data storage device performance.

In one embodiment, a data storage device includes a non-volatile memory device and a controller coupled to the non-volatile memory device and a volatile memory device. The controller is configured to read data from a block of a plurality of blocks of the non-volatile memory device responsive to executing a read command received from a host device, determine that a health of one or more blocks of the plurality of blocks of the non-volatile memory device has reached a recovery/relocation threshold, where the one or blocks are in a same exclusive or (XOR) signature as the block, and store the data of the block in the volatile memory device responsive to providing the data read from the block to the host device.

In another embodiment, a data storage device includes a non-volatile memory device and a controller coupled to the non-volatile memory device and a volatile memory device. The controller is configured to determine that at least a partial block failure has occurred to a block of a plurality of blocks of the non-volatile memory device, where the block is part of a set of blocks that are associated with an exclusive or (XOR) signature, and where the XOR signature is used to recover one or more pages of the block of the set of blocks associated with the XOR signature, determine that at least one page of the block exists in the volatile memory device, recover at least one page of the block that has failed using the XOR signature, and relocate the at least one recovered page of the block, the at least one page of the block that exists in the volatile memory device, and a remaining number of pages of the block of the set of blocks to another block of the non-volatile memory device.

In another embodiment, a data storage device includes means for storing non-volatile data and a controller coupled to the means for storing non-volatile data. The controller is configured to store data read from the means for storing non-volatile data in a means for storing volatile data and utilize the data stored in the means for storing volatile data and data stored in the means for storing non-volatile data to recover data having a read failure.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, improving relocation and recovery operations in a data storage device. During data storage device operation, data of multiple blocks of a non-volatile memory device, logically grouped as a jumboblock, may be protected by an exclusive or (XOR) signature, where the XOR signature may be used to recover data of a block of the multiple blocks. During a recovery/relocation operation, data of the jumboblock is read from the non-volatile memory device during the recovery of the lost data and again when the data is relocated. However, because the data read during data storage device operation is temporarily stored in a volatile memory device, the controller utilizes the relevant data stored in the volatile memory device and the data stored in the non-volatile memory device to recover corrupted data. Thus, the amount of reads from the non-volatile memory device decreases due to the relevant data is read from the volatile memory device, which may improve data storage device performance.

Figure 1:
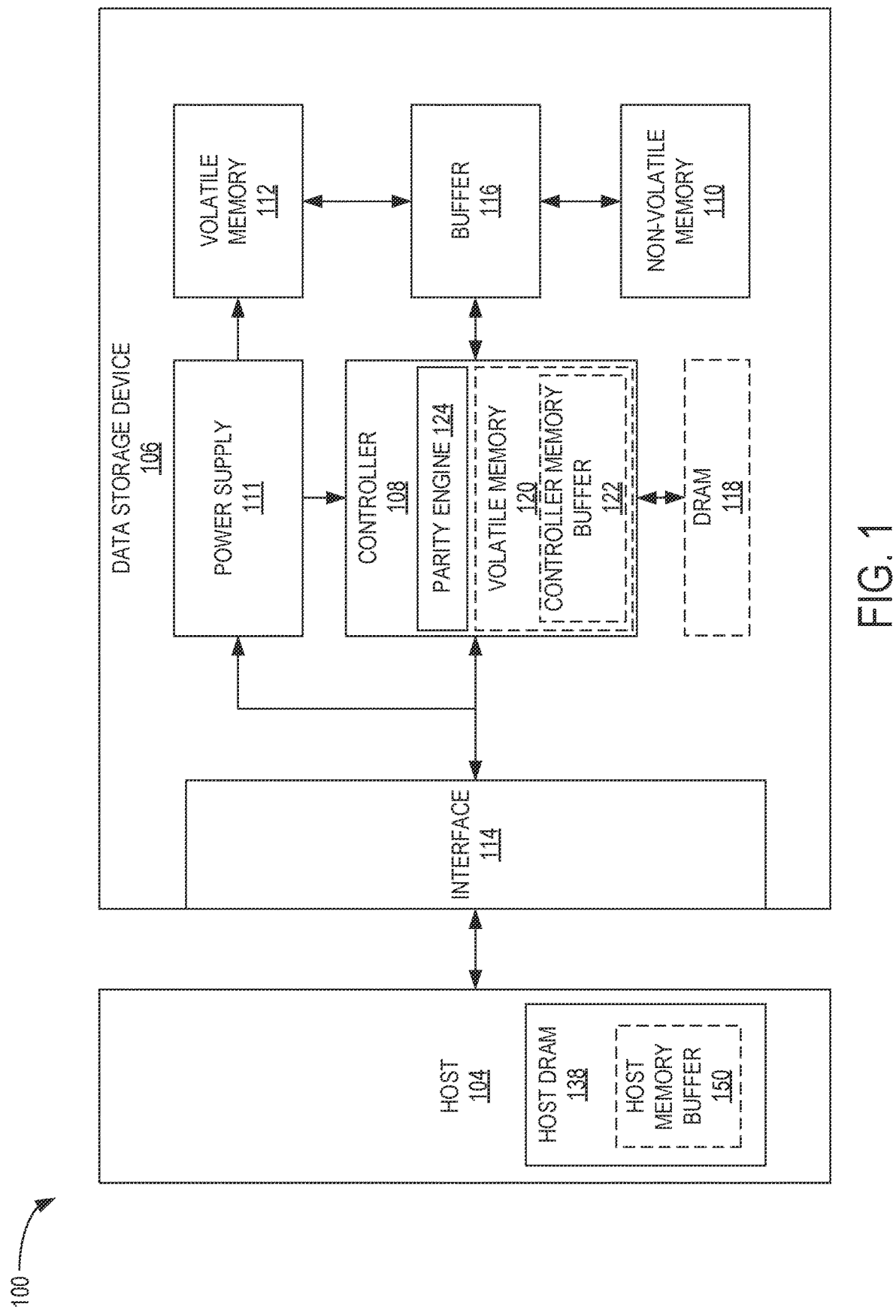
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). It is to be understood that the listed memory architectures are not intended to be limiting, but to provide examples of possible embodiments. For example, it is contemplated that higher level cell memory may be applicable, such as penta level cell (PLC) memory and the like (e.g., 6-level cell, 7-level cell, etc.). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), synchronous dynamic RAM (SDRAM (e.g., DDR1, DDR2, DDR3, DDR3L, LPDDR3, DDR4, LPDDR4, and the like)), pseudo SRAM (PSRAM) block RAM (BRAM), thyristor RAM (TRAM), accelerator RAM (XRAM), and the like. Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120 and a parity engine 124. The optional second volatile memory 120 may be similar to the volatile memory 112. For example, the optional second volatile memory 120 may be SRAM. The controller 108 may allocate a portion of the optional second volatile memory 120 to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data. The parity engine 124 may be configured to generate protection data, such as an exclusive or (XOR) signature for the data being programmed to the NVM 110, as well as utilize the generated protection data to detect and correct errors in the data read from the NVM 110.

Figure 2:
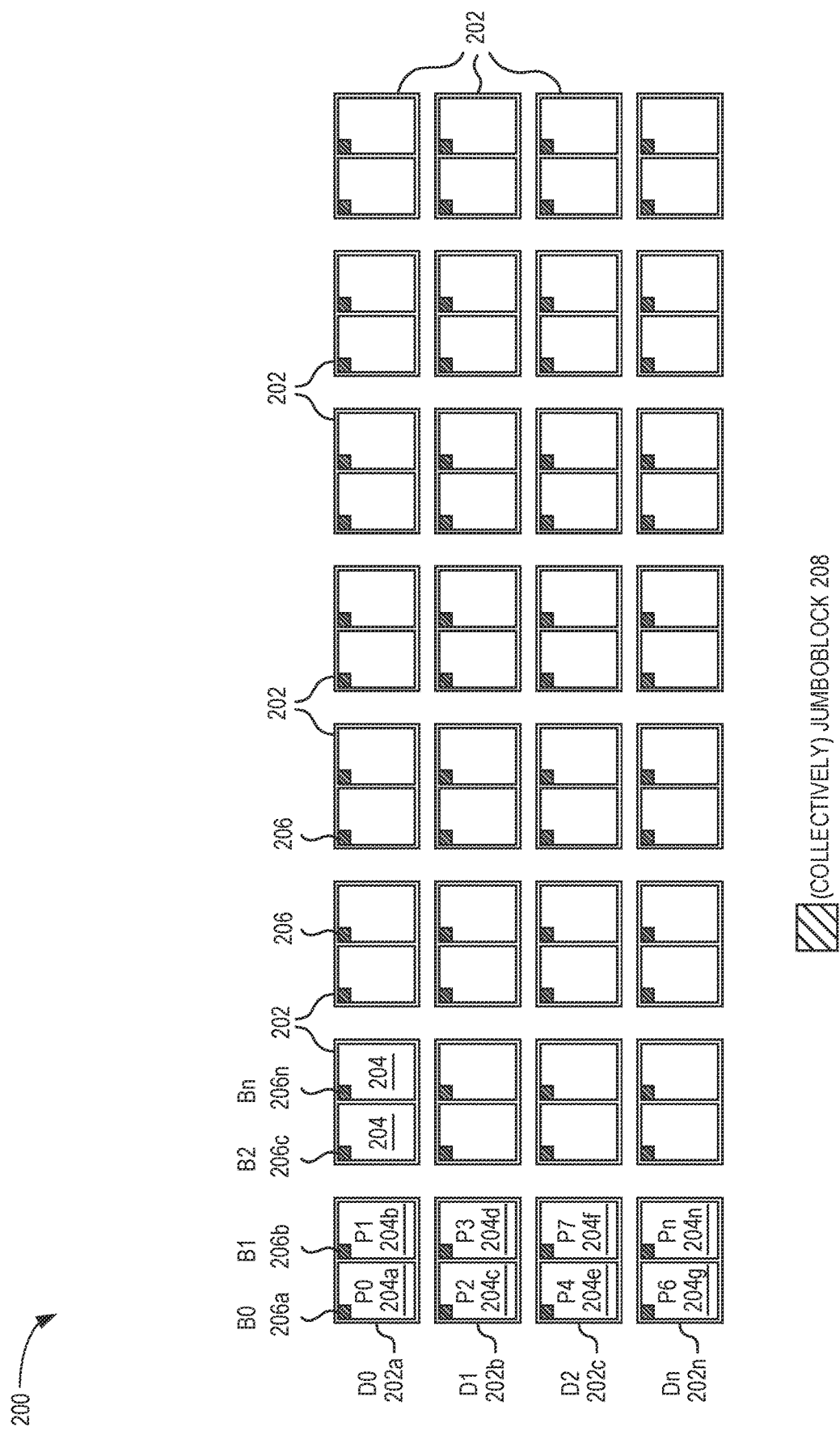
FIG. 2 is an illustration of a memory device, according to certain embodiments.

FIG. 2 is an illustration of a memory device 200, according to certain embodiments. Memory device 200 may be the NVM 110 of FIG. 1. The memory device 200 includes a plurality of dies 202a-202n, collectively referred to as dies 202, where each die of the plurality of dies 202a-202n includes a first plane 204a and a second plane 204b, collectively referred to as planes 204. Each of the planes 204 includes a plurality of blocks 206a-206n, collectively referred to as blocks 206. While 32 dies 202 are shown in the memory device 200, any number of dies may be included.

A jumboblock (JB) 208 includes a block from each plane of each die (e.g., a first block 206a of a first plane 204a of a first die 202a, a second block 206b of a second plane 204b of a first die 202a, and so-forth). In some examples, a JB may include one or more blocks from each plane of each die (e.g., a first block 206a and a second block of a first plane 204a of a first die 202a). Furthermore, in some embodiments, one or more dies 202 of the memory device 200 may be provisioned for storing XOR or parity data. Furthermore, data may be written sequentially from block to block in a first JB so that data is written to B0 206a before data is written to B1 206b.

Figure 3:
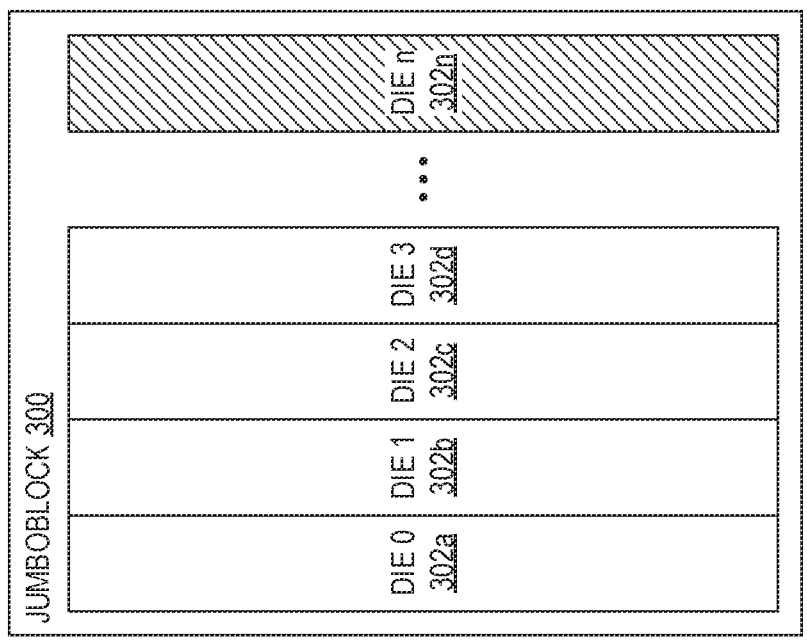
FIG. 3 is an illustration of a jumboblock, according to certain embodiments.

FIG. 3 is an illustration of a jumboblock (JB) 300, according to certain embodiments. JB 300 may be JB 208 of FIG. 2. JB 300 includes one or more blocks from a plurality of dies 302a-302n, where an nth die 302n stores parity data. Parity data may be an XOR signature generated by a parity engine, such as the parity engine 124 of FIG. 1. When an XOR signature is generated for the JB 300, the parity is calculated by XORing data from a same die-page of each block of the JB 300. For example, the parity may be calculated as (die 0 page 0) XOR (die 1 page 0) XOR (die 2 page 0) XOR . . . (die n–1 page 0), where the accumulated parity is in the size of a single die page and programmed to the parity die (i.e., the nth die 302n).

Each block having a same XOR signature may be referred to as "XOR neighbors" since the XOR signature may be used to recover a block associated with the XOR signature. For example, when a full block failure occurs, the data of the failed block may be recovered using the accumulated parity (i.e., the XOR signature) for each page of the block. Full block failure may signal that the block having data has remained in a closed state for an extended duration of time and may indicate that other blocks in the same JB may experience a full block failure as well. Because data may be written sequentially from block to block in the JB 300, blocks in the JB 300 may be closed at the same time or around the same time and may experience a full block failure within a same time period as another block in the JB 300 experiencing a full block failure.

When a full block failure occurs to a block of the JB 300, the pages of failed block may be recovered using the XOR signature associated with the JB 300 and relocated to a newly allocated JB. However, because all of the pages in the failed block cannot be read, the recovery process occurs for each page of the failed block. The recovery process includes reading the XOR signature for the JB 300, reading each page associated with the XOR signature from the JB 300, and XORing all adjacent pages of the XOR neighbors that are associated with the XOR signature. Thus, each page of the JB 300 is read twice in order to recover data. Each page is read a first time in order to recover the lost data in the failed block and a second time in order to relocate the valid data and the recovered data to a newly allocated block of the newly allocated JB. Likewise, when a partial block failure occurs (i.e., less than all of the pages of the block is associated with a read failure), each page of the block is recovered and relocated from the JB 300.

Figure 4:
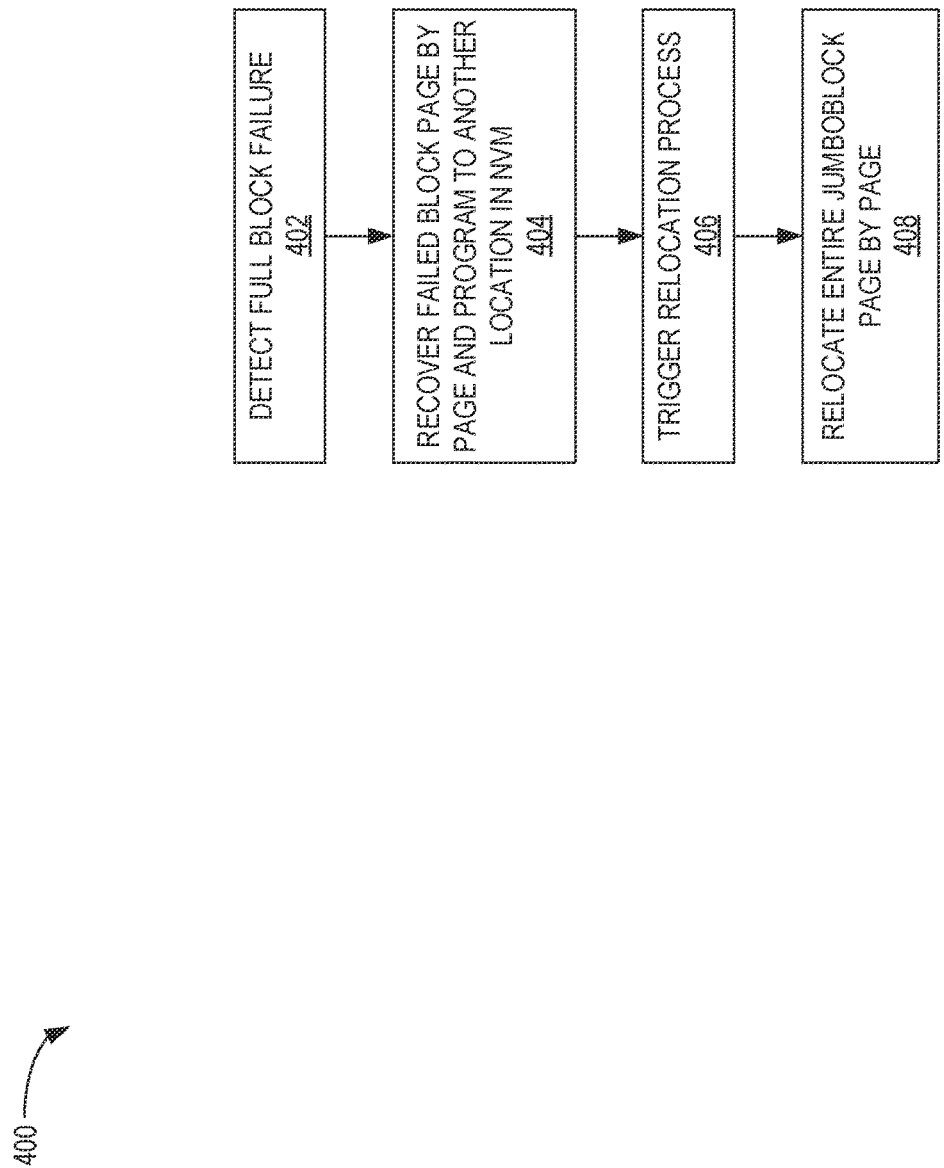
FIG. 4 is a flow diagram illustrating a method of recovering and relocating data responsive to detecting a full block failure, according to certain embodiments.

FIG. 4 is a flow diagram illustrating a method 400 of recovering and relocating data responsive to detecting a full block failure, according to certain embodiments. Method 400 may be implemented by a controller, such as the controller 108 of FIG. 1. For exemplary purposes, aspects of the storage system 100 of FIG. 1 may be referenced herein. It is to be understood that method 400 may be applicable to recovering and relocating data responsive to detecting a partial block failure.

At block 402, the controller 108 determines that a full block failure has occurred to a block of a JB of the NVM 110. At block 404, the controller 108 recovers the failed block (page by page) and programs the recovered pages to another location in the NVM 110 (i.e., another allocated JB). At block 406, the controller 108 triggers a relocation process for the other blocks of the JB having the failed block. At block 408, the entire JB (i.e., the blocks not relocated yet) are relocated to the another location in the NVM 110 storing the recovered pages of the failed block, where the relocating occurs page by page and block by block of the JB.

Figure 5:
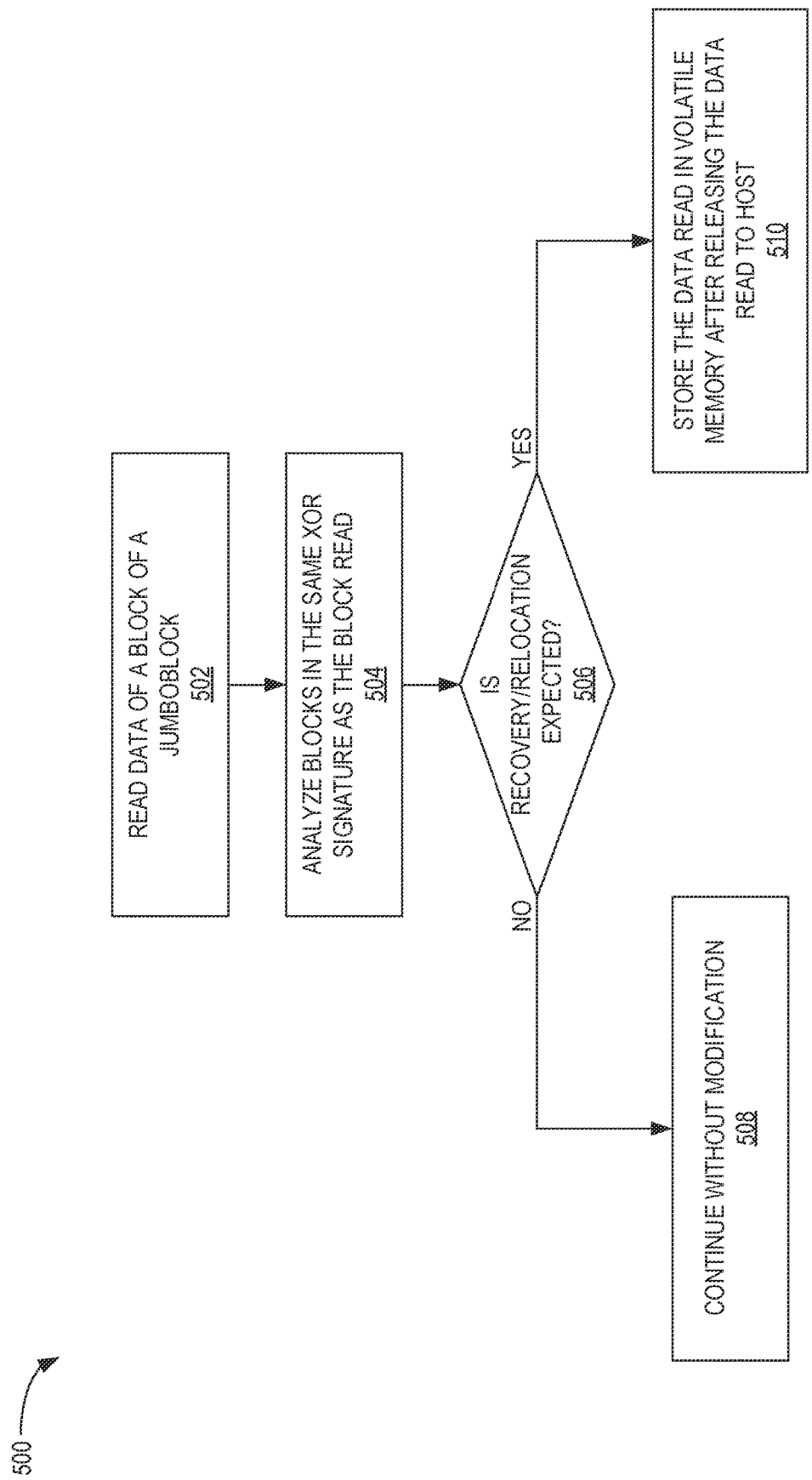
FIG. 5 is a flow diagram illustrating a method of determining whether a recovery/relocation operation will occur for the jumboblock based on analyzing blocks of the jumboblock having a same XOR signature as the block read, according to certain embodiments.

FIG. 5 is a flow diagram illustrating a method 500 of determining whether a recovery/relocation operation will occur for the jumboblock based on analyzing blocks of the jumboblock having a same XOR signature as the block read, according to certain embodiments. Method 500 may be implemented by a controller, such as the controller 108 of FIG. 1. For exemplary purposes, aspects of the storage system 100 of FIG. 1 may be referenced herein.

At block 502, the controller 108 reads data of a block of a JB. For example, the reading of data from the block of the JB may be responsive to receiving a read request for the data of the block from the host device 104. At block 504, responsive to reading the data of the block of the JB, the controller 108 analyzes the other blocks in the same XOR signature as the block read (i.e., the other blocks of the JB). Analyzing the other blocks may include determining a health metric of the other blocks, where the health metric is dependent on one or more of a program erase count (PEC) of each block of the other blocks, a bit error rate (BER) of each block of the other blocks, a read disturb metric of each block of the other blocks, a temperature of each block of the other blocks, a cross-temperature of each block of the other blocks, and an amount of power consumption of each block of the other blocks. Based on the health metric, the controller 108 may determine whether one or more blocks of the JB are expected to be recovered (i.e., the health metric reaching a threshold level) and relocated. For example, the threshold level may reflect a health metric that indicates that a block is expected to fail, but has not failed yet. In other words, the threshold level may be a level that is a predetermined value less than an actual threshold level for a block to fail, such that moving data to the volatile memory is pre-emptive.

At block 506, the controller 108 determines whether recover/relocation of one or more blocks of the JB is expected. If the recovery/relocation of one or more blocks of the JB is not expected at block 506, then method 500 continues without modification at block 508. However, if the recovery/relocation of one or more blocks of the JB is expected at block 506, then the controller 108 stores the data read from the block in volatile memory after releasing the data read to the host device at block 510 as a pre-emptive operation in order to decrease a recovery/relocation latency. The volatile memory may be an SRAM of the controller 108, a DRAM of the data storage device 106, the HMB 150 of the host device 104, or any other relevant volatile memory of the storage system 100 accessible by the controller 108. The data stored in the volatile memory may be used in a recovery operation rather than reading the same data from the NVM 110. Thus, less than all of the blocks of the JB are read from the NVM 110 and the remaining number of blocks of the JB not read from the NVM 110 are read from the volatile memory during the recovery/relocation operation.

Figure 6:
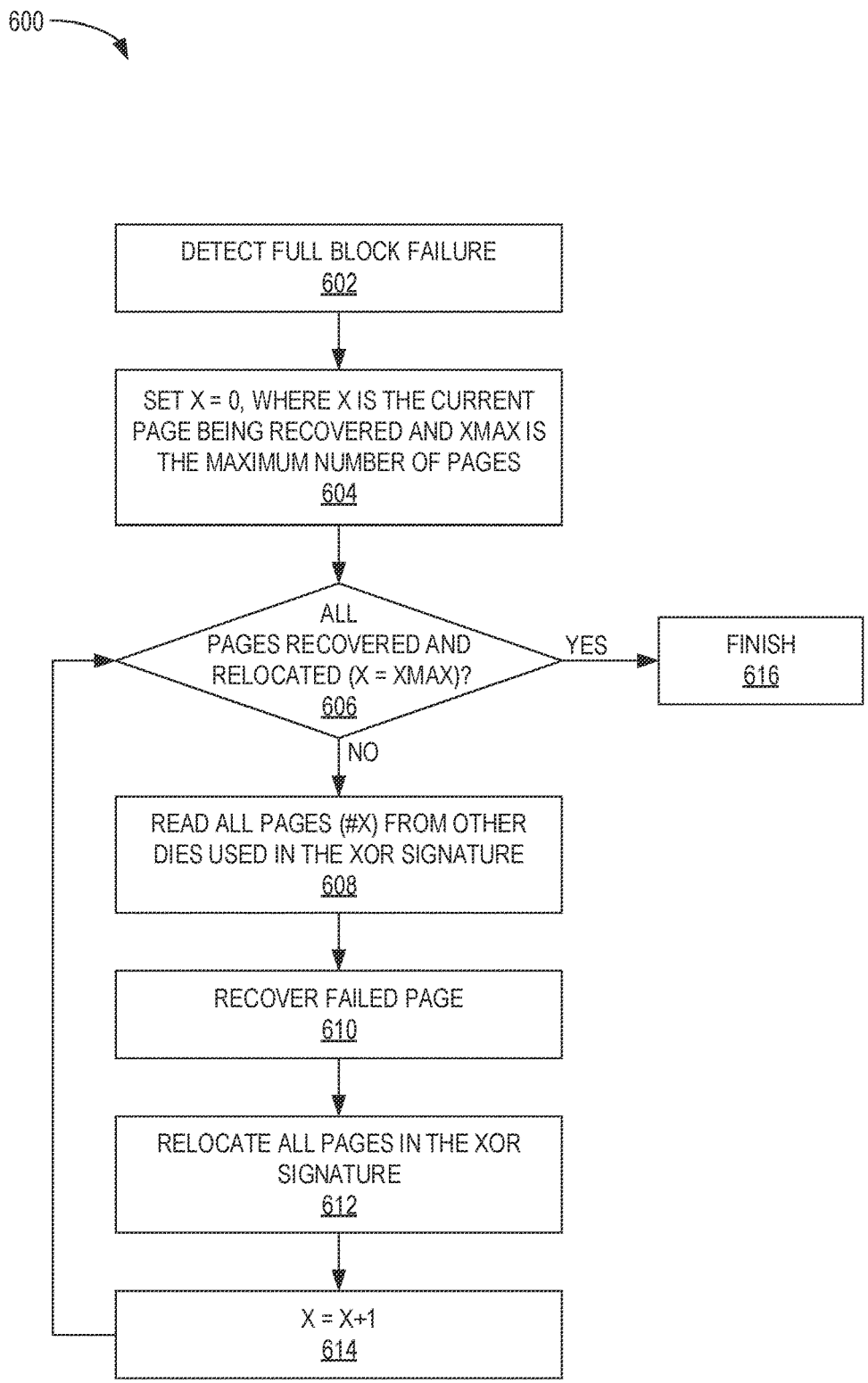
FIG. 6 is a flow diagram illustrating a method of recovering and relocating data responsive to detecting a full block failure, according to certain embodiments.

FIG. 6 is a flow diagram illustrating a method 600 of recovering and relocating data responsive to detecting a full block failure, according to certain embodiments. Method 600 may be implemented by a controller, such as the controller 108 of FIG. 1. For exemplary purposes, aspects of the storage system 100 of FIG. 1 may be referenced herein. It is to be understood that method 600 may be applicable to recovering and relocating data responsive to detecting a partial block failure.

At block 602, the controller 108 determines that a full block failure has occurred to a block of a JB of the NVM 110. At block 604, the controller 108 sets X equal to 0, where X represents the current page of the failed block being recovered and XMAX is the maximum number of pages of the failed block. At block 606, the controller 108 determines whether all the pages of the failed block have been recovered and relocated. In other words, the controller 108 determines if X is equal to XMAX. If X is equal to XMAX at block 606, then method 600 finishes at block 616.

However, if X is not equal to XMAX at block 606, then the controller 108 reads all the pages corresponding to the current page number (i.e., X) from the other dies (i.e., other blocks of the JB) used in the XOR signature at block 608. The reading of pages from the other dies used in the XOR signature may include reading one or more pages of one or more blocks from a volatile memory and reading one or more other pages of one or more other blocks from the NVM 110. The one or more pages of the one or more blocks stored in the volatile memory may be stored pre-emptively as part of method 500 as a result of determining that recovery/relocation was expected after reading the one or more pages of the one or more blocks from the respective JB of the NVM 110. In other words, the controller 108 determines which pages associated with the respective JB having the same XOR signature as the failed block are located in the volatile memory. The controller 108 then reads the pages stored in the volatile memory and the remaining pages from the NVM 110 to the volatile memory to utilize in the recovery operation.

At block 610, the controller 108 recovers the failed page using the pages read from the other dies used in the XOR signature by XORing the pages from the other dies to recover the failed page. At block 612, each of the pages, including the recovered page, of the dies of the XOR signature are relocated to an allocated JB. At block 614, the controller 108 increments X by 1 to continue the recovery operation by recovering a next page (if applicable) in the failed block. In some embodiments, the controller 108 may read the data of the JB from the NVM 110 once and store the data read in the volatile memory, where the recovery/relocation operation occurs from the volatile memory instead of both the NVM 110 and the volatile memory.

By utilizing a volatile memory to store data of a block of a jumboblock after being read, responsive to a health metric of one or more blocks of the jumboblock exceeding a threshold value for recovery/relocation, the data stored in the volatile memory may be utilized in the recovery/relocation operation, which may decrease a recovery/relocation latency, improve quality of service of the data storage device, and extend a working lifetime of the data storage device.

In one embodiment, a data storage device includes a non-volatile memory device and a controller coupled to the non-volatile memory device and a volatile memory device. The controller is configured to read data from a block of a plurality of blocks of the non-volatile memory device responsive to executing a read command received from a host device, determine that a health of one or more blocks of the plurality of blocks of the non-volatile memory device has reached a recovery/relocation threshold, where the one or blocks are in a same exclusive or (XOR) signature as the block, and store the data of the block in the volatile memory device responsive to providing the data read from the block to the host device.

Determining that the health of the one or more blocks includes determining, for each of the one or more blocks, one or more of a program erase count (PEC) of each block of the one or more blocks, a bit error rate (BER) of each block of the one or more blocks, a read disturb metric of each block of the one or more blocks, a temperature of each block of the one or more blocks, a cross-temperature of each block of the one or more blocks, and an amount of power consumption of each block of the one or more blocks. The volatile memory device is either a host memory buffer (HMB) of the host device, a static random access memory (SRAM) of the controller, or a dynamic random access memory (DRAM) of the controller. The recovery/relocation threshold is a predetermined value less than an actual recovery/relocation threshold. The controller is configured to initiate a recovery/relocation operation upon reaching the actual recovery/relocation threshold. The controller is further configured to determine that a block of the one or more blocks has reached the actual recovery/relocation threshold, determine that at least one block of the one or more blocks is stored in the volatile memory device, recover/relocate the at least one block of the one or more blocks from the volatile memory device, and recover/relocate each other block other than the at least one block of the one or more blocks from the non-volatile memory device. Less than all of the blocks of the one or blocks are read from the non-volatile memory device during the recovery/relocation operation. The XOR signature is utilized to recover data of a block of the one or more blocks during a recovery/relocation operation.

In another embodiment, a data storage device includes a non-volatile memory device and a controller coupled to the non-volatile memory device and a volatile memory device. The controller is configured to determine that at least a partial block failure has occurred to a block of a plurality of blocks of the non-volatile memory device, where the block is part of a set of blocks that are associated with an exclusive or (XOR) signature, and where the XOR signature is used to recover one or more pages of the block of the set of blocks associated with the XOR signature, determine that at least one page of the block exists in the volatile memory device, recover at least one page of the block that has failed using the XOR signature, and relocate the at least one recovered page of the block, the at least one page of the block that exists in the volatile memory device, and a remaining number of pages of the block of the set of blocks to another block of the non-volatile memory device.

Relocating the at least one page of the block that exists in the volatile memory device includes reading the at least one page of the block that exists in the volatile memory device once. Recovering the remaining number of pages of the block of the set of blocks from the non-volatile memory device includes reading the remaining number of pages of the block of the set of blocks twice. The controller is further configured to determine which pages of the block of the set of blocks are stored in the volatile memory device responsive to determining that the at least the partial block failure has occurred to the block of the plurality of blocks of the non-volatile memory device. The controller is further configured to receive a read command for another block of the set of blocks stored in the non-volatile memory device and determine a health metric of one or more blocks of the set of blocks. The controller is further configured to determine that the health metric of at least a block of the one or more blocks has reached or exceeded a predetermined threshold value and store the data of the another block associated with the read command in the volatile memory device. The controller is further configured to erase the at least one page of the block of the set of blocks from the volatile memory device responsive to recovering the at least one page of the block of the set of blocks from the volatile memory device and recovering the remaining number of pages of the block of the set of blocks from the non-volatile memory device. The volatile memory device is a host memory buffer (HMB) of a host device. The volatile memory device is either a static random access memory (SRAM) of the controller or a dynamic random access memory (DRAM) coupled to the controller. The at least the partial block failure is a full block failure.

In another embodiment, a data storage device includes means for storing non-volatile data and a controller coupled to the means for storing non-volatile data. The controller is configured to store data read from the means for storing non-volatile data in a means for storing volatile data and utilize the data stored in the means for storing volatile data and data stored in the means for storing non-volatile data to recover data having a read failure.

The data stored in the means for storing volatile data and the data stored in the means for storing non-volatile data utilized to recover data having the read failure are associated with a same exclusive or (XOR) signature. Storing the data read from the means for storing non-volatile data in the means for storing volatile data is responsive to determining that the data stored in the means for storing non-volatile data associated with a same XOR signature has reached or exceeded a health metric threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a non-volatile memory device; and
a controller coupled to the non-volatile memory device and a volatile memory device, wherein the controller is configured to:
    read data from a block of a first plurality of blocks of the non-volatile memory device responsive to executing a read command received from a host device;
    determine that a health of one or more blocks of the plurality of blocks of the non-volatile memory device has reached a recovery/relocation threshold, wherein the one or blocks are in a same exclusive or (XOR) signature as the block;
    store the block in the volatile memory device responsive to providing data read from the block to the host device, wherein a health of the block is determined to have reached the recovery/relocation threshold; and
    perform a recovery/relocation operation, wherein the recovery/relocation operation comprises:
        recovering the stored block from the volatile memory device,
        recovering the one or more blocks remaining in the non-volatile memory device, wherein the one or more blocks remaining comprise the one or more blocks except for the stored block; and
        relocating the recovered stored block and the one or more blocks remaining to a second plurality of blocks of the non-volatile memory device, wherein the second and the first plurality of blocks are separate and distinct.

2. The data storage device of claim 1, wherein determining that the health of the one or more blocks comprises determining, for each of the one or more blocks, one or more of:
a program erase count (PEC) of each block of the one or more blocks;
a bit error rate (BER) of each block of the one or more blocks;
a read disturb metric of each block of the one or more blocks;
a temperature of each block of the one or more blocks;
a cross-temperature of each block of the one or more blocks; and
an amount of power consumption of each block of the one or more blocks.

3. The data storage device of claim 1, wherein the volatile memory device is either:
a host memory buffer (HMB) of the host device;
a static random access memory (SRAM) of the controller; or
a dynamic random access memory (DRAM) of the controller.

4. The data storage device of claim 1, wherein the recovery/relocation threshold is a predetermined value less than an actual recovery/relocation threshold, wherein the controller is configured to initiate the recovery/relocation operation upon reaching the actual recovery/relocation threshold.

5. The data storage device of claim 4, wherein the controller is further configured to:
determine that a block of the one or more blocks has reached the actual recovery/relocation threshold;
determine that at least one block of the one or more blocks is stored in the volatile memory device;
recover/relocate the at least one block of the one or more blocks from the volatile memory device; and
recover/relocate each other block other than the at least one block of the one or more blocks from the non-volatile memory device.

6. The data storage device of claim 5, wherein less than all of the blocks of the one or blocks are read from the non-volatile memory device during the recovery/relocation operation.

7. The data storage device of claim 1, wherein the XOR signature is utilized to recover data of the block of the one or more blocks during the recovery/relocation operation.

8. A data storage device, comprising:
a non-volatile memory device; and
a controller coupled to the non-volatile memory device and a volatile memory device, wherein the controller is configured to:

determine that at least a partial block failure has occurred to a block of a plurality of blocks of the non-volatile memory device, wherein:
  the block is part of a set of blocks that are associated with an exclusive or (XOR) signature; and
  the XOR signature is used to recover one or more pages of the block of the set of blocks associated with the XOR signature; and
perform a recovery/relocation operation to recover at least one page of the block that has failed using the XOR signature, wherein the recovery/relocation operation comprises
  determining that the at least one page of the block that has failed using the XOR signature exists in the volatile memory device;
  recovering the at least one page of the block that has failed using the XOR signature from the volatile memory device;
  recovering a remaining number of pages of the block from the non-volatile memory device; and
  relocating the at least one recovered page of the block from the volatile memory device, and the remaining number of pages of the block from the non-volatile memory device to another block of the non-volatile memory device.

9. The data storage device of claim 8, wherein recovering the at least one page of the block that has failed using the XOR signature comprises reading the at least one page of the block that has failed using the XOR signature from the volatile memory device once.

10. The data storage device of claim 9, wherein recovering the remaining number of pages of the block of the set of blocks from the non-volatile memory device comprises reading the remaining number of pages of the block of the set of blocks twice.

11. The data storage device of claim 8, wherein the controller is further configured to:
  determine which pages of the block of the set of blocks are stored in the volatile memory device responsive to determining that the partial block failure has occurred to the block of the plurality of blocks of the non-volatile memory device.

12. The data storage device of claim 8, wherein the controller is further configured to:
  receive a read command for another block of the set of blocks stored in the non-volatile memory device; and
  determine a health metric of one or more blocks of the set of blocks.

13. The data storage device of claim 12, wherein the controller is further configured to:
  determine that the health metric of at least a block of the one or more blocks has reached or exceeded a predetermined threshold value; and
  store the data of the another block associated with the read command in the volatile memory device.

14. The data storage device of claim 13, wherein the controller is further configured to:
  erase the at least one page of the block that has failed using the XOR signature from the volatile memory device responsive to the performance of the recovery/relocation operation.

15. The data storage device of claim 8, wherein the volatile memory device is a host memory buffer (HMB) of a host device.

16. The data storage device of claim 8, wherein the volatile memory device is either a static random access memory (SRAM) of the controller or a dynamic random access memory (DRAM) coupled to the controller.

17. The data storage device of claim 8, wherein the at least the partial block failure is a full block failure.

18. A data storage device, comprising:
  means for storing non-volatile data; and
  a controller coupled to the means for storing non-volatile data and means for storing volatile data, wherein the controller is configured to:
    store data read from the means for storing non-volatile data in the means for storing volatile data; and
    utilize the data stored in the means for storing volatile data and data stored in the means for storing non-volatile data to recover data having a read failure, wherein the utilizing comprises:
      determining that a portion of the data stored in the means for storing non-volatile data is unrecoverable;
      determining that the portion of the data exists in the means for storing volatile data;
      recovering the portion of the data from the means for storing volatile data;
      recovering a remaining portion of the data from the means for storing non-volatile data; and
      relocating the recovered portion of the data, from the means for storing volatile data, and the remaining portion of the data, from the means for storing non-volatile data, to another location of the means for storing non-volatile data.

19. The data storage device of claim 18, wherein the data stored in the means for storing volatile data and the data stored in the means for storing non-volatile data utilized to recover data having the read failure are associated with a same exclusive or (XOR) signature.

20. The data storage device of claim 19, wherein storing the data read from the means for storing non-volatile data in the means for storing volatile data is responsive to determining that the data stored in the means for storing non-volatile data associated with a same XOR signature has reached or exceeded a health metric threshold.

* * * * *